UNITED STATES PATENT OFFICE.

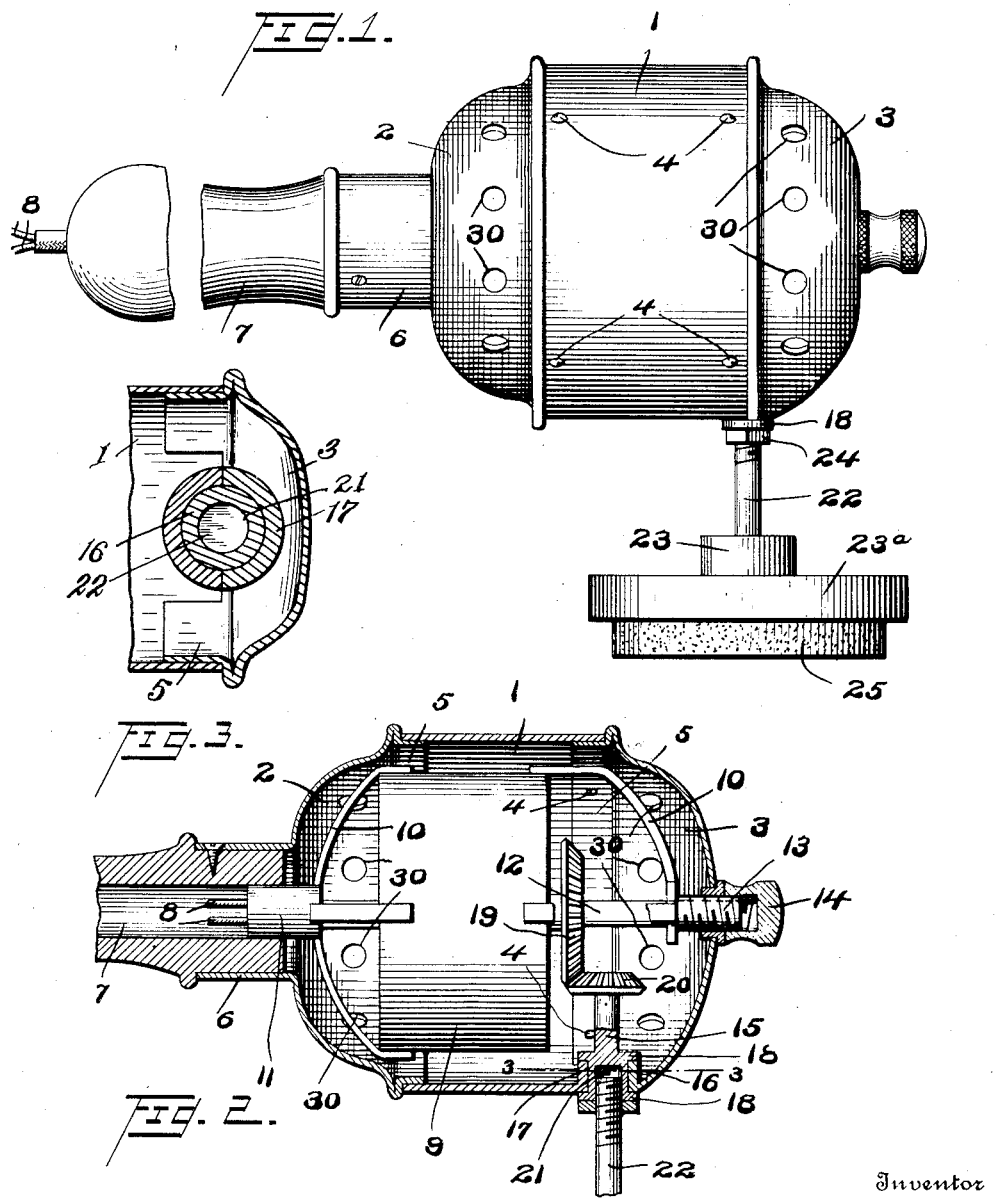

FLOYD BISCH, OF PHILADELPHIA, PENNSYLVANIA.

PORTABLE ELECTRIC MOTOR.

1,142,482. Specification of Letters Patent. Patented June 8, 1915.

Application filed March 9, 1914. Serial No. 823,551.

*To all whom it may concern:*

Be it known that I, FLOYD BISCH, a citizen of the United States, residing at Philadelphia, in the county of Philadelphia and State of Pennsylvania, have invented certain new and useful Improvements in Portable Electric Motors, of which the following is a specification.

My invention relates to improvements in portable electric motors, the object of the invention being to provide an electric motor driven device which is adapted primarily for use in surfacing wood.

A further object is to provide an improved device of this character which will be neat and attractive in appearance, strong and durable in use, and which will greatly facilitate the surfacing of wood.

With these and other objects in view, the invention consists in certain novel features of construction and combinations and arrangements of parts as will be more fully hereinafter described and pointed out in the claims.

In the accompanying drawings: Figure 1 is a broken view in side elevation illustrating my improvements. Fig. 2 is a view in longitudinal section, and Fig. 3 is a view in horizontal section on the line 3—3 of Fig. 2.

1 represents a casing of general cylindrical form having ends 2 and 3 secured to the body of the casing by screws 4 which project through the wall of the casing and through inwardly projecting flanges 5 on the ends 2 and 3. The end 2 has an integral collar 6 which is secured around a tubular handle 7 through which electric wires 8 project to supply current to a motor 9 located within the casing and supported by frames 10.

One frame 10 has a shank 11 projecting into the tubular handle 7, while the other frame has a central opening for the reception of the motor shaft 12. This shaft 12 turns in a bearing 13 in end 3, and has a cap 14 inclosing its outer end.

15 represents a driven shaft which is located at right angles to the drive shaft 12, and is provided with a cylindrical enlargement 16 mounted to turn in a bearing 17 formed in casing 1 and end 3. In other words, half of the bearing is in the casing 1, and the other half in the end 3, and this bearing formed by the two sections is of cylindrical shape and is confined between annular flanges 18 on the enlargement 16, so that while the shaft is free to turn in the bearing, it is held by the flanges against longitudinal movement.

Shafts 13 and 15 are connected by miter gears 19 and 20 which are preferably raw hide gears to reduce noise to a minimum. The enlargement 16 has a screw-threaded socket 21 to receive the screw-threaded shank 22 of the tool 23, and a jam nut 24 is provided on the shank 22 to securely hold the parts against independent turning movement when in place.

The tool 23 consists of a cup 23ᵃ which incloses the upper portion of the block of pumice stone 25 or other suitable material.

In operation, the device is grasped by the handle 7, and the tool pressed against the surface of the wood. In finishing wood, the pumice stone 25 would be first used and then finished by a suitable felt pad or other tool. By reason of this device the surface can be rapidly and uniformly finished and the great labor of hand finishing can be dispensed with.

In order that the parts may be kept cool, I provide perforations 30 in the ends 2 and 3 as clearly shown in Figs. 1 and 2, and through these perforations a suitable tool may be inserted to lubricate the parts as may be desired.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A device of the character described, comprising a casing, ends removably secured to the casing, a handle secured to one end of the casing, said casing and one end thereof having half bearings formed therein, a driven shaft having an enlargement thereon, said enlargement located in the bearing and having flanges at opposite ends of the bearing, a motor in the casing, a shaft driven by the motor, said motor shaft and first-mentioned shaft connected by miter gears, and means for connecting a tool to said enlargement, substantially as described.

2. A device of the character described, comprising a casing, ends removably secured to the casing, a handle secured to one end of the casing, said casing and one end thereof having half bearings formed therein, a driven shaft having an enlargement thereon, said enlargement located in the bearing and having flanges at opposite ends of the bearing, a motor in the casing, a shaft driven by the motor, said motor shaft and first-mentioned shaft connected by miter gears, said enlargement having a threaded tool-receiving socket therein, substantially as described.

In testimony whereof I have signed my name to this specification in the presence of two subscribing witnesses.

FLOYD BISCH.

Witnesses:
M. E. DITTUS,
CHAS. E. POTTS.